Patented July 21, 1942

2,290,241

UNITED STATES PATENT OFFICE 2,290,241

METHOD OF POLISHING CURED CASEIN ARTICLES AND COMPOSITION FOR USE IN SUCH METHOD

Daniel Kasen, Newark, N. J.

No Drawing. Application November 19, 1938,
Serial No. 241,461

12 Claims. (Cl. 18—48)

My invention relates to a method of producing polished casein material and polished casein articles.

The present application is a continuation in part of my copending application for method of molding polished casein material and polished casein articles, Serial No. 81,967, filed May 26, 1936.

An important object of the invention is to provide a chemical polishing solution which will polish cured casein material or cured casein articles without pitting or scarring the same, or without causing the articles polished to stick together when removed from the bath.

A further object of the invention is to provide a chemical polishing solution which will polish cured casein material or cured casein articles and reduce the discoloration of the same to the minimum.

A further object of the invention is to provide a chemical polishing solution for polishing cured casein material or cured casein articles, having the chlorine content and the free alkali content balanced or substantially equal in weight, whereby the treated cured casein material or the treated cured casein articles will not have their surfaces rendered sticky by the action of the excess free alkali, eliminating the necessity of a subsequent acid treatment to neutralize such alkali.

A further object of the invention is to provide a method for chemically polishing white cured casein articles without discoloring the same.

Other objects and advantages of the invention will be apparent during the course of the following description.

It is known in the industry that a water solution of a hypochlorite, such as sodium hypochlorite, will polish cured casein articles. However, this hypochlorite solution may pit or scar the cured casein articles. When casein articles, such as buttons, are moulded in a cool mould, as explained in my Patent No. 2,045,471, their surfaces are remarkably true and free from flaws, pits or scars. It is therefore highly desirable in chemically polishing casein articles moulded in a cool mould and then cured and subsequently chemically polished to effect such chemical polishing without producing pits or scars therein.

I have discovered an improved solution of a hypochlorite which will satisfactorily chemically polish cured or hardened casein material or cured or hardened casein articles without marring or pitting the same, and without rendering the surfaces of the same sticky so that they will tend to stick together when removed from the bath. As is well known, when cured casein articles are polished by the ordinary hypochlorite solution, not only are the surfaces frequently pitted or scarred but the surfaces are rendered sticky to a considerable extent so that the articles tend to stick together when removed from the bath. To overcome this disadvantage, after the usual chemical polishing, the cured casein material or the cured casein articles are frequently subjected to the action of an acid, to neutralize the alkali present thereon. By my method, the chemically polished cured casein material or the chemically polished cured casein articles do not tend to stick together when removed from the bath, and the subsequent treatment by the acid is entirely eliminated, thus saving a step in the method.

As an example of my improved hypochlorite solution, I employ a water solution containing chlorine (Cl) and free sodium hydroxide (NaOH) as a free alkali. It is preferred to have the chlorine present in from 1% to 2% by weight with respect to the entire weight of the solution and the free sodium hydroxide is present in substantially the same percent by weight as the available chlorine. As an example, my improved chemical polishing solution may contain 1.5% by weight of available chlorine and 1.5% by weight of free sodium hydroxide. Since the available chlorine and the free sodium hydroxide are present in the same percentage by weight, the sodium hydroxide will combine with the available chlorine, during the polishing period, so that there is no excess free sodium hydroxide, at the end of the polishing reaction, to render the surface of the cured casein material or articles tacky or sticky, which would necessitate a treatment with an acid to neutralize the same. Further, I have discovered that by having the chlorine and free sodium hydroxide present in the same percent by weight, that the discoloring of the cured white casein material is reduced to the minimum.

The invention is not restricted to the use of the particular hypochlorite stated, as hypochlorites of potassium and calcium may be used. It is preferred to use sodium hypochlorite on account of its cheapness. The invention is also not necessarily restricted to sodium hydroxide as other hydroxides may be employed, such as potassium hydroxide and calcium hydroxide.

I prefer to use my improved hypochlorite solution or bath at a temperature at from 140° F. to 212° F., although this temperature may be widely varied, and the solution may be used cool or at room temperature, such as 70° F. or lower, in which event an increased length of time is necessary for its reaction, or the temperature of the solution may even exceed 212° F., in which event the solution would be subjected to a pressure exceeding atmospheric pressure.

In the practice of my method, by the use of my improved chemical polishing solution, the uncured casein material, colored or white, is heated and molded into the desired articles, such as buttons, by subjecting the same to pressure in a cool mold. These articles are allowed to cool and harden and are subsequently cured, in the usual manner. This molding procedure is in accordance with the disclosure in my Patent 2,045,471, issued June 23, 1936. The cured casein articles or buttons produced by my molding operation have their surfaces remarkably free from flaws, scars or pits. These cured casein articles are next immersed in my improved hypochlorite solution or bath, as desired, with the bath having a temperature of preferably from 140° F. to 212° F. This improved hypochlorite solution acts upon the cured casein articles and polishes the same and this polishing action ordinarily continues for about three minutes, but if the temperature of the solution is lowered, the time for polishing will be increased accordingly.

Since the free alkali in the solution is present in the same percent by weight as the available chlorine, as described in connection with my improved hypochlorite solution, such improved hypochlorite solution will not pit or mar the cured casein articles, nor will it render the surfaces of the articles tacky or sticky, so that the articles will tend to stick together, when removed from the bath. It is important that the percent by weight of the free alkali should not substantially exceed the percent by weight of the available chlorine, for if the free alkali should be present in a percent by weight in excess of the percent by weight of the available chlorine, the excess free alkali will cause the surfaces of the polished cured casein articles to become tacky or sticky so that such articles will tend to stick together when removed from the bath. Further, the presence of the free alkali in the same percent by weight as the available chlorine, causes the improved hypochlorite solution to produce a minimum discoloration of cured casein articles, colored or white.

My improved polishing hypochlorite solution is not necessarily restricted in use in polishing cured molded casein articles, molded in a cool mold, as the same may be employed to polish cured casein articles which have been machined or cut from cured casein material, extruded or unextruded, and may also be employed in polishing cured casein material, in the form of sheets, rods or tubes, extruded or unextruded.

After the treatment with my improved polishing solution, the cured casein articles are washed in water to remove all traces of the reaction compounds, and dried.

There has long been a demand for pure white cured casein articles, such as buttons. These cured casein articles have been produced and have been polished by a mechanical polishing method. This mechanical polishing method consists in subjecting the white cured casein articles to a tumbling action in the presence of an abrasive or polishing material. This tumbling polishing method is not wholly satisfactory, particularly where the cured articles to be polished have fissures or undercuts.

It has been the practice to chemically polish white cured casein articles by a solution of a hypochlorite. The disadvantage in the use of this chemical polishing is that the hypochlorite solution discolors the white casein articles, turning them creamy or yellow and rendering them unfit for the trade. For this reason, it is the general practice to polish such white cured casein articles by the mechanical method.

I have discovered that the discoloring effect of the chemical polishing solution may be overcome and pure white polished casein articles produced, by the chemical polishing method. To accomplish this, the white casein articles, after being cured and after the chemical polishing step, are subjected to the action of hydrogen peroxide. The result is that the chemically polished cured casein articles are pure white.

I will now described my process of treating discolored white cured casein articles or material, which have been chemically polished by the use of my improved hypochlorite chemical polishing solution, or by the use of the ordinary hypochlorite chemical polishing solution.

After the chemical polishing of cured pure white casein articles or material, by the use of my improved hypochlorite chemical polishing solution, it will be found that the same have been discolored or turned creamy, to a certain extent, although this discoloration is reduced to a minimum by the use of my improved polishing solution. Although the polished cured originally pure white casein articles, now turned slightly creamy, are a commercial product, yet it is frequently highly desirable to obtain a pure white chemically polished cured casein article. After the white cured casein article has been chemically polished with my improved polishing solution and then washed with water, before or after drying, such articles are introduced into a solution of hydrogen peroxide. The hydrogen peroxide solution preferably has a hydrogen peroxide content of substantially 15% to 25% by weight, and is preferably used at room temperature, such as 50° F. to 90° F., although these temperatures may go outside of these limits. If the solution is warm, it will become quickly spent due to the escape of the oxygen. The polished discolored white cured casein articles are immersed into this hydrogen peroxide solution and may remain therein for some ten to thirty minutes, although this time may go beyond these limits. The immersed articles may be observed and when they become pure white they may be removed. After the hydrogen peroxide treatment is completed, the hydrogen peroxide solution is poured off and the articles washed in water to remove all traces of the hydrogen peroxide, and then dried. The hydrogen peroxide may be reused, if desired.

While I have found that satisfactory results are obtainable by using a 15% to 25% solution of hydrogen peroxide, yet the invention is not restricted to this strength of solution, as the same may be widely varied. The particular strength is not ordinarily important as the same results may be obtained with a weaker solution but the treatment will have to be prolonged. Some degree of success could be had by employing a hydrogen peroxide solution as weak as 3%, but the time of immersion will have to be greatly prolonged. The advantage in using a strong 25% hydrogen peroxide solution is that the immersion period is cut down to from ten to thirty minutes, with the result that the cured casein material does not absorb any appreciable amount of water and the drying period is correspondingly reduced.

The hydrogen peroxide treatment will result in restoring the chemically polished discolored white cured casein articles to their original pure white condition, thus producing a highly desirable product. Further, the hydrogen peroxide will have a polishing effect upon the discolored white articles, but this polishing effect is by no means as pronounced as the polishing effect of the hypochlorite solution.

I also contemplate polishing cured casein articles, by using the ordinary hypochlorite chemical polishing solution, whereby the originally pure white cured casein articles are considerably discolored or rendered creamy, and then subjecting the same to the action of hydrogen peroxide, as before explained. This treatment will result in restoring to the creamy polished cured casein articles the pure white condition.

I also contemplate using my hydrogen peroxide treatment upon discolored white cured casein articles, which have been produced by my molding method, or otherwise produced, or upon discolored white cured casein material, extruded or unextruded, all of which have been subjected to a chemical polishing solution to polish the same. This chemical polishing solution may be my improved hypochlorite polishing chemical solution, the ordinary hypochlorite polishing chemical solution, or any chemical polishing solution, the action of which will discolor the articles or material.

It is to be understood that the forms of my invention herewith shown and described are to be taken as preferred examples of the same, and that various changes may be resorted to in the steps of the method, and in the temperatures and pressures and that known chemical equivalents may be employed without departing from the spirit of my invention or the scope of the subjoined claims.

Having thus described my invention, I claim:

1. The method of polishing white cured casein articles, comprising subjecting such white cured casein articles to the polishing action of a hypochlorite solution whereby the article is polished and incidentally discolored, washing the polished article, and then subjecting the polished discolored article to the action of a solution of hydrogen peroxide to restore the normal white color of the article.

2. The method of polishing white cured casein articles, comprising subjecting such white cured casein articles to the polishing action of a hypochlorite solution whereby the article is polished and incidentally discolored, washing the polished article, and then subjecting the polished discolored article to the action of a 15% to a 25% hydrogen peroxide solution to restore the white color of the same.

3. The method of polishing white cured casein articles, comprising subjecting such casein articles to the action of a water solution containing available chlorine and a free alkali, washing the article thus treated, and then subjecting the washed article to the action of a solution of hydrogen peroxide to restore the white color of the article.

4. A method of polishing white cured casein articles, comprising subjecting such white cured casein articles to the action of a chemical solution capable of polishing the same and incidentally discoloring them, washing the polished articles, and then subjecting the polished articles to the action of a solution of hydrogen peroxide to restore the normal white color of the articles.

5. A water solution for chemically polishing cured casein articles without the necessity of a subsequent acid treatment, said solution containing the resultant constituents of chlorine and an alkali metal hydroxide selected from the group consisting of sodium hydroxide, potassium hydroxide, and calcium hydroxide, the alkali metal hydroxide being originally added in substantially an equal amount by weight with respect to the weight of the chlorine, substantially all of the alkali metal hydroxide combining with the chlorine so that there is substantially no free alkali metal hydroxide present at the end of the polishing action.

6. A water solution for chemically polishing cured casein articles without the necessity of a subsequent acid treatment, said solution containing the resultant constituents of chlorine and sodium hydroxide, the sodium hydroxide being originally added in substantially an equal amount by weight with respect to the weight of the chlorine, substantially all of the sodium hydroxide combining with the chlorine so that there is substantially no free sodium hydroxide present at the end of the polishing action.

7. A water solution for chemically polishing cured casein articles without the necessity of a subsequent acid treatment, said solution containing the resultant constituents of chlorine and sodium hydroxide, the chlorine being originally added in 1.5% by weight and the sodium hydroxide in 1.5% by weight, substantially all of the sodium hydroxide combining with the chlorine so that there is substantially no free sodium hydroxide at the end of the polishing action.

8. The method of polishing cured casein articles, comprising subjecting such casein articles to the action of a water solution containing the resultant constituents of chlorine and an alkali metal hydroxide selected from the group consisting of sodium hydroxide, potassium hydroxide, and calcium hydroxide, the alkali metal hydroxide being originally added in substantially an equal amount by weight with respect to the weight of the chlorine, substantially all of the alkali metal hydroxide combining with the chlorine so that there is substantially no free alkali metal hydroxide present at the end of the polishing action, and washing the articles thus treated.

9. The method of polishing cured casein articles, comprising subjecting such casein articles to the action of a water solution containing the resultant constituents of chlorine and an alkali metal hydroxide selected from the group consisting of sodium hydroxide, potassium hydroxide, and calcium hydroxide, the chlorine being originally added in substantially 1.5% with respect to the weight of the solution and the alkali metal hydroxide being originally added in substantially 1.5% with respect to the weight of the solution, substantially all of the alkali metal hydroxide combining with the chlorine so that there is substantially no free alkali metal hydroxide present at the end of the polishing action, maintaining the temperature of the solution from 140° F. to 180° F. during the polishing action, and then washing the article.

10. The method of polishing cured casein articles, comprising subjecting such casein articles to the action of a water solution containing the resultant constituents of chlorine and an alkali metal hydroxide selected from the group consisting of sodium hydroxide, potassium hydroxide, and calcium hydroxide, the chlorine being originally added in from 1% to 2% by weight with respect to the weight of the solution and the alkali metal hydroxide being originally added in from 1% to 2% by weight with respect to the weight of the solution, substantially all of the alkali metal hydroxide combining with the chlorine so that there is substantially no free alkali metal hydroxide present at the end of the polishing action, and removing the articles from the polishing solution and washing the same.

11. The method of polishing cured casein articles, comprising subjecting such casein articles to a water solution containing the resultant constituents of chlorine and sodium hydroxide, the sodium hydroxide being originally added in substantially an equal amount by weight with respect to the weight of the chlorine, washing the articles thus treated, and then subjecting the articles to the action of a solution of hydrogen peroxide.

12. The method of polishing white cured casein articles, comprising subjecting such white cured casein articles to the polishing action of a water solution containing chlorine and an alkali metal hydroxide selected from the group consisting of sodium hydroxide, potassium hydroxide, and calcium hydroxide, the alkali metal hydroxide being originally added by weight in substantially an equal amount with respect to the weight of the chlorine, washing the articles thus treated, and then subjecting the polished articles to the action of a solution of hydrogen peroxide to restore the normal white color of the articles.

DANIEL KASEN.